(12) United States Patent
Takagi et al.

(10) Patent No.: US 6,771,488 B2
(45) Date of Patent: Aug. 3, 2004

(54) SOLID ELECTROLYTIC CAPACITOR AND METHOD OF MANUFACTURING THE CAPACITOR

(75) Inventors: Seiji Takagi, Osaka (JP); Ayumi Kochi, Osaka (JP); Yuji Mid, Osaka (JP); Yasuo Kanemitsu, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/451,748

(22) PCT Filed: Oct. 22, 2002

(86) PCT No.: PCT/JP02/10927
§ 371 (c)(1),
(2), (4) Date: Nov. 14, 2003

(87) PCT Pub. No.: WO03/036671
PCT Pub. Date: May 1, 2003

(65) Prior Publication Data
US 2004/0066608 A1 Apr. 8, 2004

(30) Foreign Application Priority Data
Oct. 26, 2001 (JP) .................................... 2001-328820

(51) Int. Cl.⁷ ................................................ H01G 9/00
(52) U.S. Cl. ................. 361/523; 361/525; 361/528; 361/516; 361/520; 361/509
(58) Field of Search ............................. 361/523, 525, 361/528, 508, 509, 512, 516, 520, 522, 530, 532, 504, 517

(56) References Cited

U.S. PATENT DOCUMENTS 6,392,869 B2 * 5/2002 Shiraishi et al. ............ 361/523
6,464,739 B2 * 10/2002 Yoshida et al. ............. 29/25.03
6,473,293 B2 * 10/2002 Shimada et al. ............ 361/523
6,602,741 B1 * 8/2003 Kudoh et al. ............... 438/141

FOREIGN PATENT DOCUMENTS

JP 2001-85273 3/2001

OTHER PUBLICATIONS

International Search Report corresponding to application No. PCT/JP02/10927 dated Jan. 28, 2003 (w/translation).

* cited by examiner

Primary Examiner—Chau N. Nguyen
Assistant Examiner—Nguyen T. Ha
(74) Attorney, Agent, or Firm—RatnerPrestia

(57) ABSTRACT

A capacitor includes a valve metal foil including a valve metal porous body and a lead portion, a dielectric layer provided on the valve metal porous body, a solid electrolyte layer on the dielectric layer, a collector layer on the solid electrolyte layer, an anode lead connected to the lead portion, a housing for accommodating the valve metal porous body, the dielectric layer, the solid electrolyte layer, the collector layer, and the anode lead, and for having an end of the anode lead exposed from a surface of the housing, an anode external terminal provided over the housing and connected with the end of the anode lead, and a cathode external terminal provided over the housing and coupled with the collector layer. The capacitor has a large capacitance, a small ESR, and a small ESL.

113 Claims, 9 Drawing Sheets

SOLID ELECTROLYTIC CAPACITOR AND METHOD OF MANUFACTURING THE CAPACITOR

This application is a U.S. national phase application 371 of PCT international application PCT/JP02/10927, filed Oct. 22, 2002.

TECHNICAL FIELD

The present invention relates to a solid electrolytic capacitor and a method of manufacturing the capacitor.

BACKGROUND ART

Electronic equipment, such as a personal digital assistant, is recently required to be smaller and to have a high performance, and it has been accordingly demanded that electronic components have high performance in small bodies. A solid electrolytic capacitor placed in a secondary side of a power circuit, or close to a central processing unit (CPU) of a personal computer is required to have a large capacitance in a lower profile and a lower equivalent series resistance (ESR) as well as a lower equivalent series inductance (ESL). To reply to the requirement, various studies, such as surface condition of the anode, a method of forming dielectric layer, development of and improvements in a solid electrolyte layer, and the structure of a capacitor element have been carried out.

FIG. 16 is a sectional view of a conventional solid electrolytic capacitor. Dielectric layer 4 is formed of foil or sintered material 2 made of valve metal, such as tantalum, aluminum, and niobium, by anodization. Solid electrolyte layer 5 formed of oxide of transition metal, such as Mn, is formed on the surface of dielectric layer 4. Collector layer 6 is formed on the surface of solid electrolyte layer 5. Anode lead frame 8 is connected with lead portion 1 of an anode, while cathode lead frame 9 is connected with collector layer 6. The capacitor is covered with housing resin 7 to have anode lead frame 8 and cathode lead frame 9 exposed.

Since including the lead frames, the conventional solid electrolytic capacitor hardly includes a large volume of the anode for a large capacitance and hardly has a small ESR and a small ESL.

SUMMARY OF THE INVENTION

A capacitor includes a valve metal foil including a valve metal porous body and a lead portion, a dielectric layer provided on the valve metal porous body, a solid electrolyte layer on the dielectric layer, a collector layer on the solid electrolyte layer, an anode lead connected to the lead portion, a housing for accommodating the valve metal porous body, the dielectric layer, the solid electrolyte layer, the collector layer, and the anode lead, and for having an end of the anode lead exposed from a surface of the housing, an anode external terminal provided over the housing and connected with the end of the anode lead, and a cathode external terminal provided over the housing and coupled with the collector layer. The capacitor has a large capacitance, a small ESR, and a small ESL.

DESCRIPTION OF THE PREFERRED EMBODIMENT (Exemplary Embodiment 1)

Figure 1:
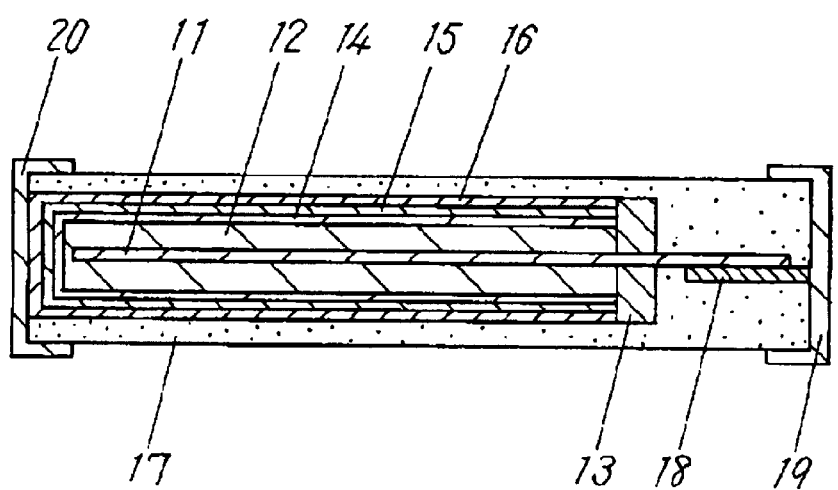
FIG. 1 is a sectional view of a solid electrolytic capacitor in accordance with exemplary embodiment 1 of the present invention.

FIG. 1 is a sectional view of a solid electrolytic capacitor in accordance with exemplary embodiment 1 of the present invention. The capacitor includes valve metal foil 11, valve metal porous body 12, and insulating layer 13 for electrically insulating between the anode and cathode to prevent the anode and cathode from short-circuited. In FIG. 1, porous body 12 is formed on both sides of foil 11, and insulating layer 13 is thus formed on both sides of foil 11. If porous body 12 is formed on one side of foil 11, insulating layer 13 is formed on the same side only. Dielectric layer 14 is formed on the surface of porous body 12 by anodization. Layer 14 may be formed of organic dielectric by an electro-deposition process. Solid electrolyte layer 15 is formed on the surface of dielectric layer 14 by chemical polymerization and/or electrolytic polymerization. Solid electrolyte layer 15 is made of conductive polymer, such as polypyrrole, polythiophene, and a derivative of each polymer. The conductive polymer forming solid electrolyte layer 15, since having a small resistibility, allows the solid electrolytic capacitor to have a small equivalent series resistance (ESR). Solid electrolyte layer 15 may be formed of manganese dioxide, which is generally used for the layer. In this case, layer 15 may be obtained by applying manganese nitrate to the surface of dielectric layer 14 and then performing heat decomposition to the surface.

Polypyrrole and its derivative can be formed easily into a film having a uniform thickness, thus providing a solid electrolytic layer having a uniform thickness. As a result, a capacitor element can be easily accommodated in the solid electrolytic capacitor.

Polythiophene and its derivative can be formed easily into a solid electrolyte layer having a large heat resistance, thus providing a capacitor having a large heat resistance.

Collector layer 16 made of carbon and conductive paste is formed on the surface of solid electrolyte layer 15. Housing resin 17 is formed of thermoset resin, such as epoxy, or thermoplastic resin having a large heat resistance.

The conductive polymer formed by chemical polymerization forms the solid electrolyte layer in fine holes of the valve metal porous body, thus allowing the solid electrolytic capacitor to have a large capacitance efficiently.

The conductive polymer is formed continuously on the surface of the dielectric layer by electrolytic polymerization, thus providing the solid electrolyte layer having fine-grained texture and a highly-protective coating. The solid electrolyte layer intimately contacts the collector layer, thus allowing the solid electrolytic capacitor to have a small ESR.

Anode lead 18 made of aluminum or metal other than valve metal is electrically connected with foil 11 of valve metal. Anode external terminal 19 is electrically connected with anode lead 18. A lead portion made of the valve metal is easily oxidized at the outside of housing resin 17. To avoid the oxidization, the lead portion is connected to anode external terminal 19 through anode lead 18. Cathode external terminal 20 is electrically connected to collector layer 16. Both anode external terminal 19 and cathode external terminal 20 may be formed by plating or the like. Anode lead-out 18 made of the aforementioned material prevents anode lead 18a from having a strong oxide film having a large resistance formed on the surface of the lead 18a, thus allowing anode lead 18 to be easily connected with anode external terminal 19.

Next, a method of manufacturing the capacitor of embodiment 1 will be described.

Figure 5:
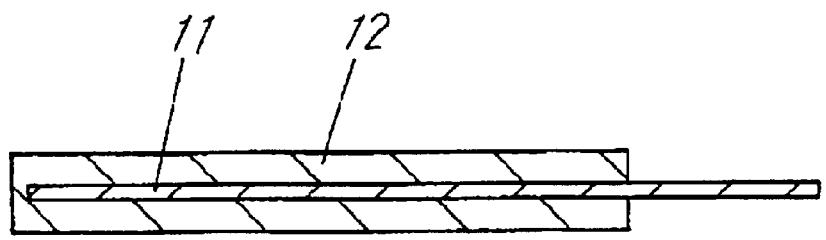
FIG. 5 is a sectional view of an anode of the solid electrolytic capacitor of the embodiments of the invention.

FIG. 5 is a sectional view of the anode of the capacitor including valve metal foil 11 and valve metal porous body 12. Porous body 12 may be formed by screen-printing, dispensing, dye coating, powder-molding, or the like.

Figure 6:
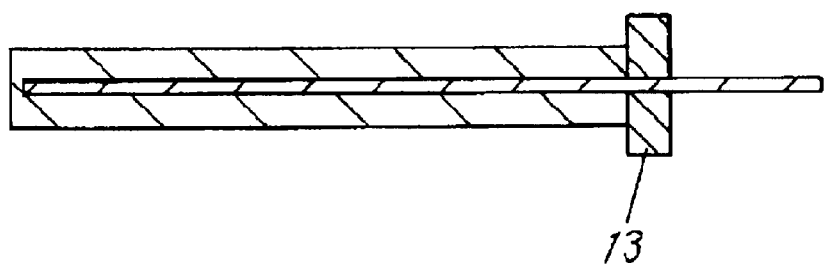
FIG. 6 is a sectional view of the capacitor of the embodiments.

Next, as shown in FIG. 6, anode-cathode insulating layer 13 made of epoxy, silicon resin, or the like, is formed at the lead portion of the anode efficiently by screen-printing, using a dispenser, dye coating or the like.

In FIG. 6, valve metal porous body 12 is formed on both sides of valve metal foil 11, and anode-cathode insulating layer 13 is accordingly formed on both sides of foil 11. If porous body 12 is formed on one side of foil 11, insulating layer 13 is formed on the same side only.

Insulating layer 13 may be formed after dielectric layer 14 is formed or after solid electrolyte layer 15 is formed. In the latter case, insulating layer 13 formed after dielectric layer 14 and solid electrolyte layer 15 are removed from the lead portion at which insulating layer 13 is supposed to be formed can further prevents the short-circuiting. If being formed after the dielectric layer, insulating layer 13 can be formed of material which may affect the formation of the dielectric layer. This expands a election range of the material, thereby increasing productivity of a solid electrolytic capacitor.

Figure 7:
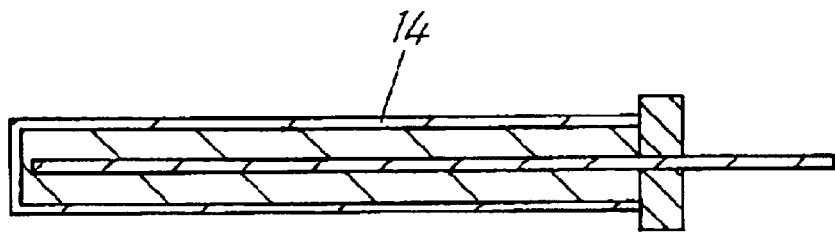
FIG. 7 is a sectional view of the capacitor of the embodiments.

Next, as shown in FIG. 7, dielectric layer 14 is formed on the surface of valve metal porous body 12 by anodization or electro-deposition process using organic dielectric. The anodization provides a polarized solid electrolytic capacitor, while the electro-deposition process provides a non-polarized solid electrolyte capacitor.

Figure 8:
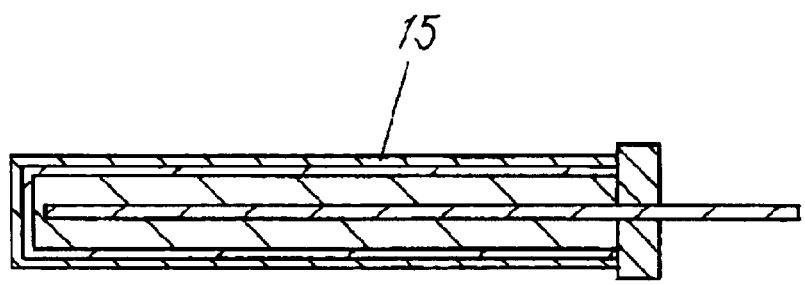
FIG. 8 is a sectional view of an anode of the capacitor of the embodiments.

Next, as shown in FIG. 8, solid electrolyte layer 15 made of the conductive polymer or manganese dioxide is formed on the surface of dielectric layer 14 by chemical polymerization, electrolytic polymerization, or heat decomposition of manganese nitrate.

The chemical polymerization allows the thickness of the solid electrolyte layer to be proportional to an amount of applied electricity for the chemical polymerization, thus allowing the thickness of the layer to be easily controlled. As a result, the polymerization can provides the solid electrolyte layer with a small variations of the thickness from batch to batch.

Figure 9:
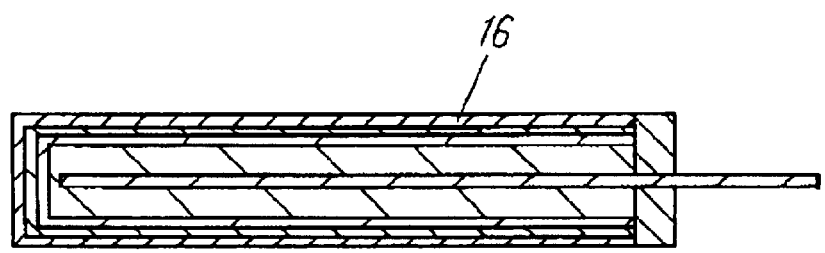
FIG. 9 is a sectional view of an anode of the capacitor of the embodiments.

Next, as shown in FIG. 9, collector layer 16 is formed on the surface of solid electrolyte layer 15 with carbon and conductive paste similarly to a conventional process.

Figure 10:
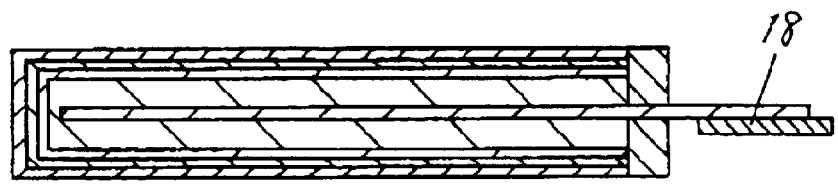
FIG. 10 is a sectional view of an anode of the capacitor of the embodiments.

Next, as shown in FIG. 10, anode lead 18 made of aluminum or metal other than valve metal is formed at a lead portion of the anode. Anode lead 18 may be formed before dielectric layer 14 is formed.

Figure 11:
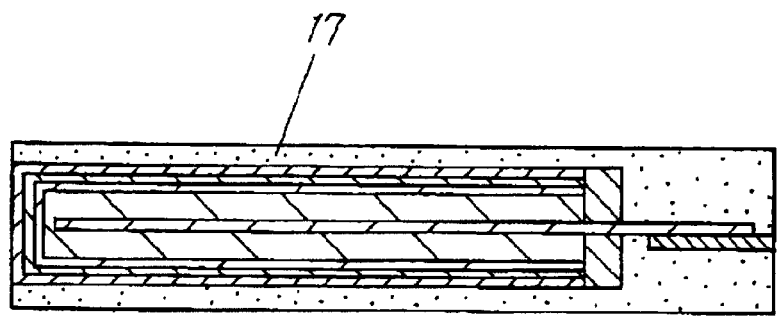
FIG. 11 is a sectional view of an anode of the capacitor of the embodiments.

Next, as shown in FIG. 11, housing resin 17 is formed to expose an end of anode lead 18 and a part of collector layer 16. Housing resin 17 is made of thermoplastic resin, such as epoxy, or a thermoset resin having a large heat resistance.

Figure 12:
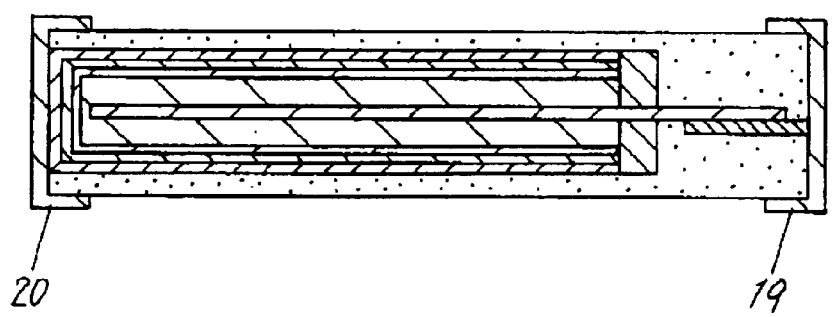
FIG. 12 is a sectional view of an anode of the capacitor of the embodiments.

Next, as shown in FIG. 12, anode external terminal 19 and cathode external terminal 20 are formed by electroplating or the like.

The process above provides the solid electrolytic capacitor having good electrical characteristics.

(Exemplary Embodiment 2)

Figure 2:
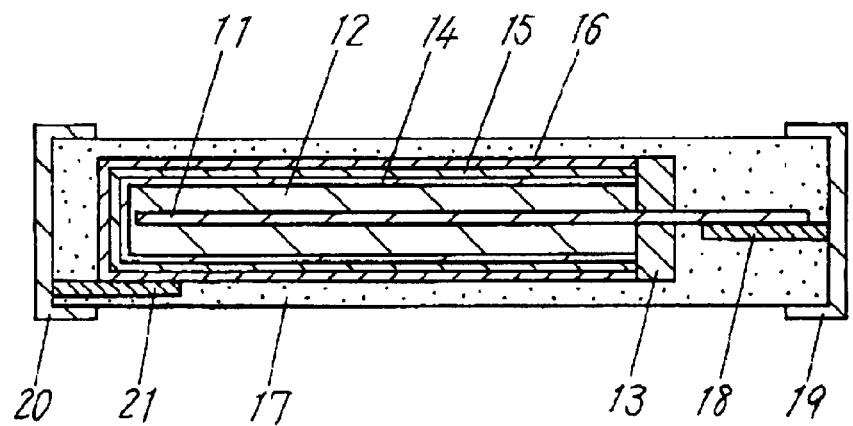
FIG. 2 is a sectional view of a solid electrolytic capacitor in accordance with exemplary embodiment 2 of the invention.

FIG. 2 is a sectional view of a solid electrolytic capacitor in accordance with exemplary embodiment 2 of the present invention. The capacitor of the embodiment is differentiated from the capacitor of embodiment 1 shown in FIG. 1 in cathode lead 21.

Cathode lead 21 electrically connects collector layer 16 with cathode external terminal 20. Cathode lead 21 is made of material of anode lead 18, i.e., aluminum or metal other than valve metal. Anode external terminal 19 and cathode external terminal 20 can be produced simultaneously at the same step, thereby simplifying processes of manufacturing the capacitor. Similarly to anode lead 18, an end of cathode lead-out 20 is exposed to the outside of housing resin 17 and is electrically connected with cathode external terminal 20.

The capacitor of the embodiment is manufactured by processes shown in FIG. 5 to FIG. 9 of embodiment 1, and then by a process of forming cathode lead 21.

Cathode lead 21 may be formed at any stage after collector layer 16 is formed and before housing resin 17 is formed.

(Exemplary Embodiment 3)

Figure 3:
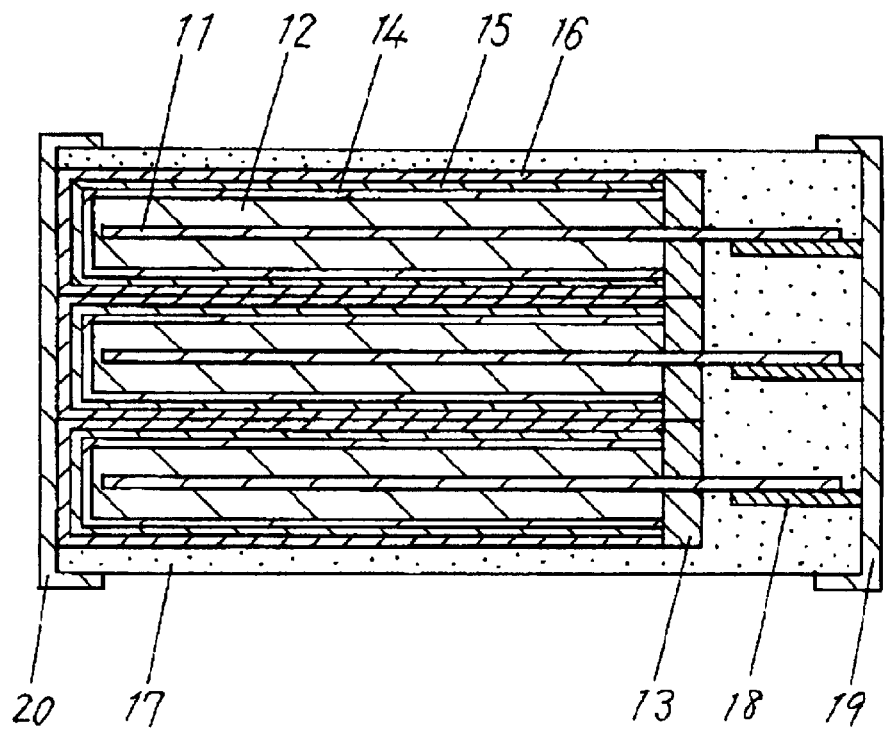
FIG. 3 is a sectional view of a solid electrolytic capacitor in accordance with exemplary embodiment 3 of the invention.

FIG. 3 is a sectional view of a solid electrolytic capacitor in accordance with exemplary embodiment 3 of the present invention. The capacitor of the embodiment is differentiated from the capacitor illustrated in FIG. 1 of embodiment 1 in including stacked capacitor elements. The stacked capacitor elements provide the solid electrolytic capacitor with a large capacitance. Additionally, a parallel connection of the capacitor elements decreases an equivalent serious resistance (ESR).

The capacitor of the embodiment includes three capacitor elements stacked, but it is not limited to three. More capacitor elements provide the solid electrolytic capacitor with a larger capacitance and a smaller ESR.

The capacitor of embodiment 2 includes the stacked capacitor elements formed through the process for forming collector layers 16, respectively, shown in FIG. 9 of embodiment 1.

Then, by the same processes as embodiment 1, anode lead 18 is formed at respective lead portion, housing resin 17 is formed, and then, anode external terminal 19 and cathode external terminal 20 are formed.

Anode lead 18 may be formed before the capacitor elements are stacked. This process allows anode lead 18 to be formed easily.

Anode lead 18 may be formed before the dielectric layer is formed. Previously forming the anode lead at each lead portion not only simplify succeeding processes, but also reduces damage to the capacitor elements due to mechanical stress caused in forming the anode lead. This process can therefore decrease degradation of characteristics of a capacitor.

The capacitor of the embodiments includes the anode lead having one end just exposed to the outside of the housing resin, while the conventional capacitor includes a lead frame that is bent over a part of the surface of the housing. The capacitor of the embodiments can includes more capacitor elements stacked than the conventional capacitor.

The valve metal porous body may be formed on one surface of the valve metal foil. In this case, the anode-cathode insulating layer is formed on the side of the lead portion on which the porous body is formed. That is, the other side, on which the porous body is not formed, has no insulating layer thereon. This structure allows more capacitor elements to be stacked, thus providing the solid electrolytic capacitor with a small ESR.

(Exemplary Embodiment 4)

Figure 4:
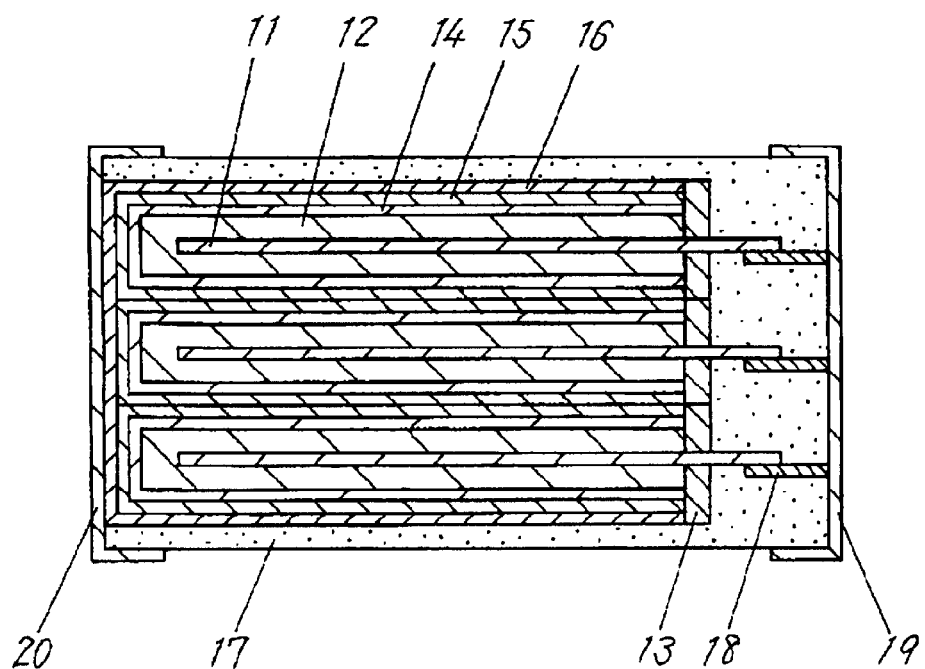
FIG. 4 is a sectional view of a solid electrolytic capacitor in accordance with embodiment 4 of the invention.

FIG. 4 is a sectional view of a solid electrolytic capacitor in accordance with exemplary embodiment 4 of the present invention. The capacitor of the embodiment is differentiated from the capacitor shown in FIG. 3 of embodiment 3 in that the capacitor elements are stacked via solid electrolyte layers 15. That is, collector layer 16 is formed on the outer surfaces of solid electrolyte layers 15 of a stacked body including the stacked capacitor elements stacked via layer 15.

According to a method of manufacturing the capacitor of embodiment 4, the capacitor elements including solid electrolyte layer 15 formed through the process shown in FIG. 8 of embodiment 1 are stacked.

Then, similarly to embodiment 1, collector layer 16 is formed, anode lead 18 is formed at each lead portion, housing resin 17 is formed, and then, anode external terminal 19 and cathode external terminal 20 are formed.

Anode lead 18 may be formed before the capacitor elements are stacked. This process allows anode lead 18 to be formed on each element easily.

(Exemplary Embodiment 5)

Figure 13:
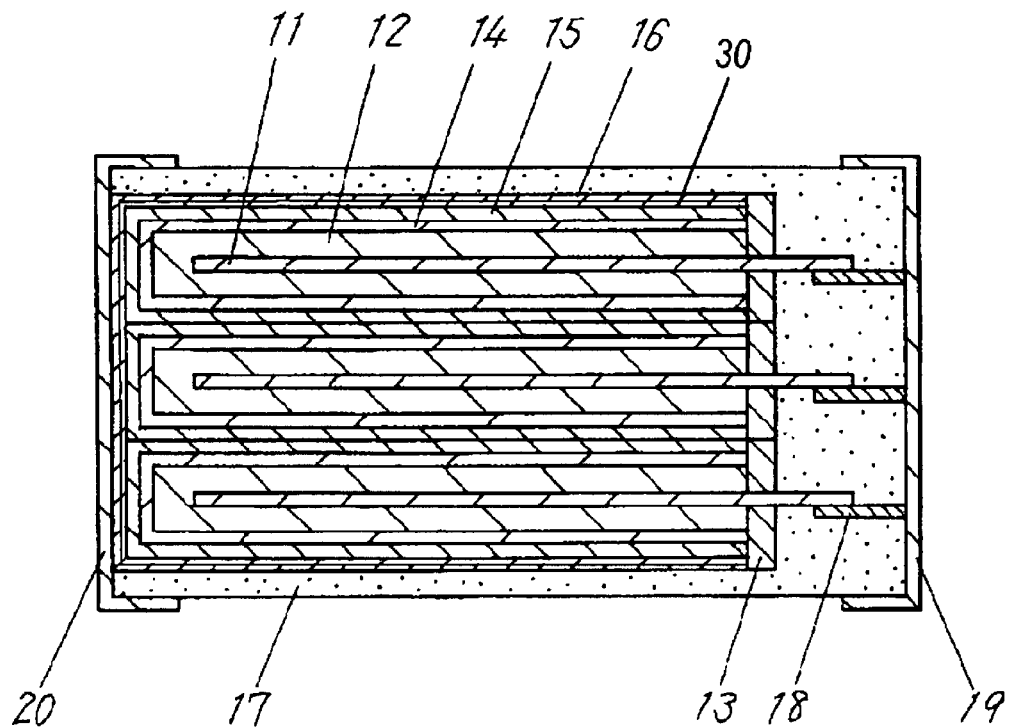
FIG. 13 is a sectional view of a solid electrolytic capacitor in accordance with exemplary embodiment 5 of the invention.

FIG. 13 is a sectional view of a solid electrolytic capacitor in accordance with exemplary embodiment 5 of the present invention. The capacitor of embodiment 5 includes second solid electrolyte layer 30 on a solid electrolyte layer covering the outer surface of a stacked body including the stacked elements, while the capacitor of embodiment 4 includes capacitor elements stacked via solid electrolyte layers. This structure provides the stacked body with a large mechanical strength.

According to a method of manufacturing the capacitor of embodiment 5, the capacitor elements are stacked after solid electrolyte layer 15 is formed through the process shown in FIG. 8 of embodiment 1, and then, second solid electrolyte layer 30 is formed on the surface of the stacked capacitors.

Then, similarly to embodiment 1, collector layer 16 is formed on the surface of second solid electrolyte layer 30, anode lead 18 is formed at each lead portion, housing resin 17 id formed, and then, anode external terminal 19 and cathode external terminal 20 are formed.

Anode lead-out 18 may be formed before the capacitor elements are stacked. This process allows anode lead 18 to be formed on each element easily.

(Exemplary Embodiment 6)

Figure 14:
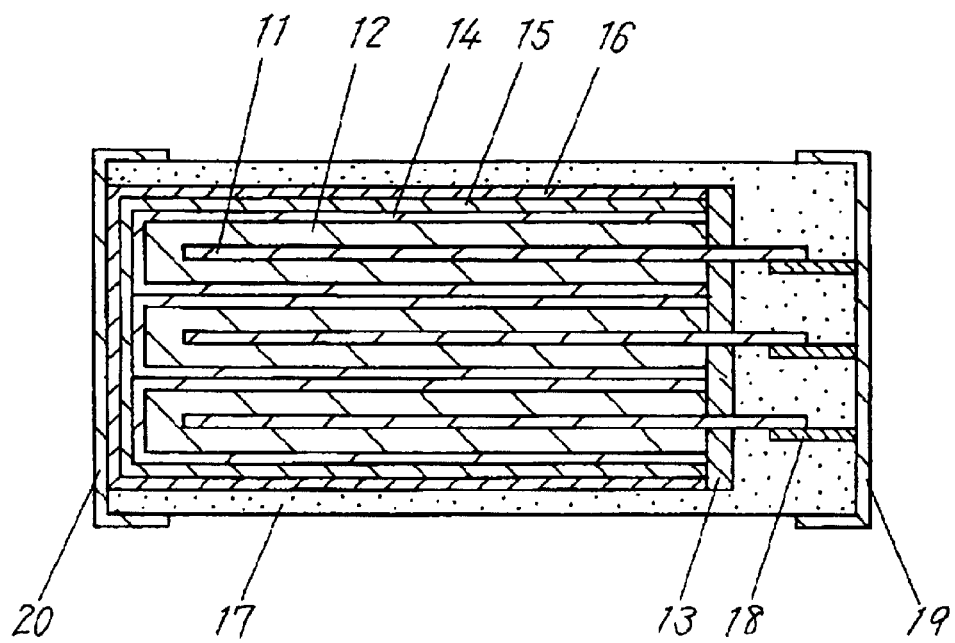
FIG. 14 is a sectional view of a solid electrolytic capacitor in accordance with exemplary embodiment 6 of the invention.

FIG. 14 is a sectional view of a solid electrolytic capacitor in accordance with exemplary embodiment 6 of the present invention. The capacitor of embodiment 6 includes capacitor elements stacked via dielectric layer 14, while the capacitor of embodiment 3 shown in FIG. 3 includes a cathode portion of each capacitor element is stacked via collector layer 16. That is, according to embodiment 6, solid electrolyte layer 15 is formed at least on exposed surface of dielectric layer 14 of a stacked body including the capacitor elements stacked via layer 14.

According to a method of manufacturing the capacitor of embodiment 6, the capacitor elements are stacked after dielectric layer 14 is formed at the process shown in FIG. 7 of embodiment 1.

Then, similarly to embodiment 1, solid electrolyte layer 15 and collector layer 16 are formed, anode lead 18 is formed at each lead portion, housing resin 17 is formed, and then, anode external terminal 19 and cathode external terminal 20 are formed.

Anode lead 18 may be formed before the capacitor elements including the layer 14 are stacked. This process allows anode lead 18 to be formed on each element easily.

EXAMPLE 1

Example 1 of a capacitor corresponds to the capacitor of embodiment 1.

Coating material was made of tantalum powder having an average particle diameter of 0.2 $\mu$m and a nominal capacitance of 100,000 CV. Then, the material was applied in a thickness of 100 $\mu$m to both surfaces of a tantalum foil with a thickness of 25 $\mu$m with a metal mask having a hole of 5 mm by 3 mm formed therein. Then, the tantalum foil was dried to form the anode.

The anode was degreased in nitric atmosphere at a temperature of 400° C., and then was baked in vacuum at a temperature of 1300° C. Anode-cathode insulating layer 13 was formed of silicone at a lead portion of the anode. Then, dielectric layer 14 was formed by 12V-anodization in phosphoric acid solution.

Then, solid electrolyte layer 15 made of polythiophene derivative was formed on layer 14 by chemical polymerization. Further, a carbon layer and a silver paint layer were applied on the surface of layer 15 to form collector layer 16.

Then, copper foil having a thickness of 100 $\mu$m was welded at the lead portion of the anode to form anode lead 18.

Then, housing 17 made of epoxy was formed so as to cover the capacitor element including anode lead 18. Anode external terminal 19 and cathode external terminal 20 were formed on each side surface of housing 17 by plating. Then, aging was performed to provide the solid electrolytic capacitor (having a size of 7.3 mm by 4.3 mm by 0.5 mm).

EXAMPLE 2

Example 2 of a capacitor corresponds to the capacitor of embodiment 2.

Similarly to example 1, anode lead 18 was formed at a lead portion of an anode, and then, cathode lead 21 was formed on collector layer 16.

Copper foil having a thickness of 100 $\mu$m was employed for cathode lead 21. Cathode lead 21 was bonded to collector layer 16 by conductive adhesive.

Next, housing 17 made of epoxy was formed so as to cover a capacitor element. Anode external terminal 19 and cathode external terminal 20 were formed on each side surface of housing 17 by plating. Then, aging was performed to provide the solid electrolytic capacitor (having a size of 7.3 mm by 4.3 mm by 0.5 mm).

EXAMPLE 3

Example 3 of a capacitor corresponds to the capacitor of embodiment 3.

Similarly to example 1, four capacitor elements including anode leads 18, respectively, are stacked.

Then, housing 17 made of epoxy was formed so as to cover the stacked elements. Anode external terminal 19 and cathode external terminal 20 were formed on each side surface of housing 17 by plating. Then, aging was performed to provide the solid electrolytic capacitor (having a size of 7.3 mm by 4.3 mm by 2.0 mm).

EXAMPLE 4

Example 4 of a capacitor corresponds to the capacitor of embodiment 3.

Similarly to example 1, eight capacitor elements having collector layers 16, respectively, were stacked. Anode lead 18 was formed at a lead portion of each of the stacked capacitor elements. Then, similarly to example 1, the solid electrolytic capacitor was provided (having a size of 7.3 mm by 4.3 mm by 4.0 mm).

EXAMPLE 5

Example 4 of a capacitor corresponds to the capacitor of embodiment 4.

Similarly to example 1, nine capacitor elements having solid electrolyte layers 15, respectively, were stacked. Collector layer 16 was formed on the surface of the stacked elements. Then, similarly to example 1, the solid electrolytic capacitor was provided (having a size of 7.3 mm by 4.3 mm by 4.5 mm).

EXAMPLE 6

Example 6 of a capacitor corresponds to the capacitor of embodiment 4.

Similarly to example 1, nine capacitor elements having solid electrolyte layers (not shown), respectively, were stacked. Solid electrolyte layer 30 made of polythiophene derivative was formed at least on an exposed outer surface of solid electrolyte layer 15 disposed on the stacked elements by chemical polymerization.

Next, collector layer 16 was formed on the surface of the stacked elements, and anode lead 18 was formed at a lead portion of each the capacitor elements. Then, similarly to example 1, the solid electrolytic capacitor was provided (having a size of 7.3 mm by 4.3 mm by 4.5 mm).

EXAMPLE 7 example 7 of a capacitor corresponds to the capacitor of embodiment 6.

Similarly to example 1, ten capacitor elements having dielectric layers 14, respectively, were stacked. Solid electrolyte layer 15 made of polythiophene derivative was formed at least on an exposed outer surface of dielectric layer 14 applied to the stacked elements by chemical polymerization, and then, collector layer 16 formed of carbon and a silver paint layer were formed. Then, anode lead-out 18 was formed at a lead portion of each of the capacitor elements. Then, similarly to example 1, the solid electrolytic capacitor was provided (having a size of 7.3 mm by 4.3 mm by 4.5 mm).

COMPARATIVE EXAMPLE 1

Figure 15:
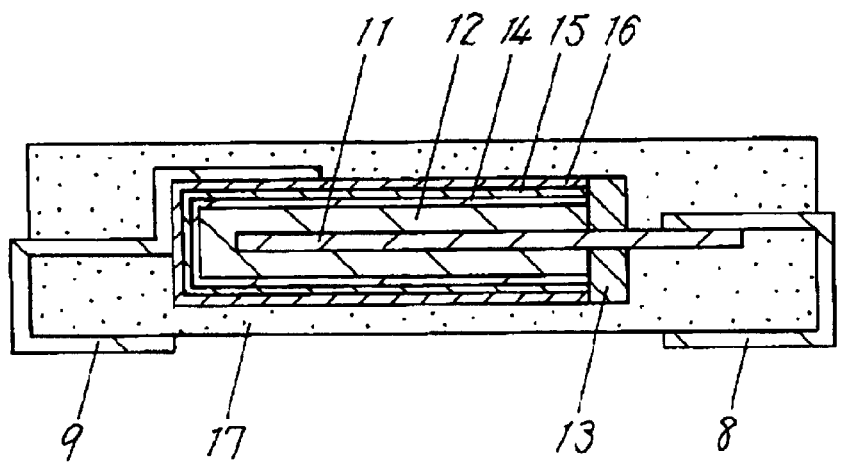
FIG. 15 is a sectional view of a comparative example of a solid electrolytic capacitor.
Figure 16:
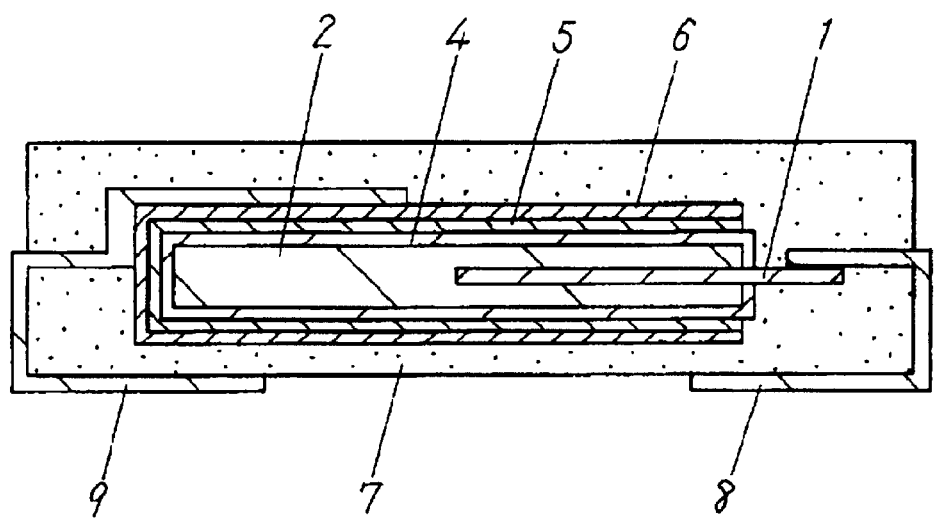
FIG. 16 is a sectional view of a conventional solid electrolytic capacitor.

FIG. 15 is a sectional view of comparative example 1 of a solid electrolytic capacitor.

Coating material was made of tantalum powder having an average particle diameter of 0.2 $\mu$m and a nominal capacitance of 100,000 CV. Next, the coating material was applied in a thickness of 100 $\mu$m to both surfaces of a tantalum foil having a thickness of 25 $\mu$m with a metal mask having a hole of 5 mm by 3 mm formed therein. Then, the tantalum foil was dried to form an anode.

Through providing the anode with collector layer 16 similarly to example 1, a capacitor element was formed. Then, aging was performed to provide the solid electrolytic capacitor (having a size of 7.3 mm by 4.3 mm by 0.5 mm).

Ten capacitors for each of examples, example 1 to example 7, and comparative example 1, are measured in capacitance at 120 Hz, in the ESR at 100 kHz, and the ESL at 5 MHz. Table 1 shows an average of measurements of the ten capacitors for each example.

TABLE 1

|  | Number of Stacked Capacitor Elements | Capacitance ($\mu$F) | ESR (m$\Omega$) | ESL (nH) |
| --- | --- | --- | --- | --- |
| Example 1 | 1 | 102 | 26 | 4.18 |
| Example 2 | 1 | 103 | 28 | 4.21 |
| Example 3 | 4 | 407 | 9.0 | 4.12 |
| Example 4 | 8 | 811 | 4.4 | 4.13 |
| Example 5 | 9 | 898 | 4.0 | 4.11 |
| Example 6 | 9 | 906 | 3.6 | 4.12 |
| Example 7 | 10 | 1017 | 3.0 | 4.08 |
| Comparative Example 1 | 1 | 68 | 33 | 7.07 |

The capacitors of examples 1 and 2 includes the same number of capacitor elements as that of comparative example 1. Nevertheless, the capacitors of examples 1 and 2 have larger capacitances, smaller ESRs, and smaller ESL than those of the capacitor of comparative example 1. This is because the capacitors of examples 1 and 2 exclude lead frames 8 and 9 included in the conventional capacitor.

That is, the solid electrolytic capacitor according to the present invention can includes the anode having a large volume due to eliminating lead frames 8 and 9.

The capacitor of the present invention has the small ESR and the small ESL since not having an ESR provided by lead frames 8 and 9 or an ESL provided by an extending length of lead frames 8 and 9 connected with external electrodes 19 and 20 to be loaded on characteristics of the capacitor.

The capacitance increases substantially in proportional to the number of the stacked capacitor elements, while the ESR decreases substantially in inversely-proportional to the number of the capacitor elements, thus providing the measurements theoretically.

The capacitors of examples 5 to 7 have substantially the same sizes and are differentiated from one another in the time the capacitor elements are stacked. The capacitor of example 7 including the capacitor elements stacked after dielectric layer 14 is formed more than the capacitors of examples 5 and 6. This is because capacitor elements stacked at an earlier stage of its manufacturing process has a reduced thickness between the layers of the stacked elements. That is, the capacitor elements can be stacked more in a limited space in a solid electrolytic capacitor, thus providing the capacitor with an advantage in its capacitance and ESR.

Any capacitor of examples 1 to 7 are clearly different from the capacitor of comparative example 1 in characteristics any of capacitors of the examples selected due to manufacturing process has characteristics superior to the capacitor of comparative example 1.

According to the present invention, the tantalum porous body is formed on both sides of the tantalum foil. The porous body may can be formed on one side only, and in this case, anode lead 18 formed on the side having porous body 12 allows the capacitor elements to be effectively stacked.

According to the present invention, tantalum is used for the valve metal, but it is not limited to. Other valve metal, such as aluminum, niobium, titanium, and zirconium, can provide the same effect.

INDUSTRIAL APPLICABILITY

A solid electrolytic capacitor according to the present invention, since not including a lead frame, can include an anode having a large volume, thus having a large capacitance.

What is claimed is:

1. A capacitor comprising:
   a valve metal foil including a valve metal porous body and a lead portion;
   a dielectric layer provided on said valve metal porous body;
   a solid electrolyte layer on said dielectric layer;
   a collector layer on said solid electrolyte layer;
   an anode lead connected to said lead portion;
   a housing for accommodating said valve metal porous body, said dielectric layer, said solid electrolyte layer, said collector layer, and said anode lead, and for having an end of said anode lead exposed from a surface thereof;
   an anode external terminal provided over said housing and connected with said end of said anode lead; and
   a cathode external terminal provided over said housing and coupled with said collector layer.

2. The capacitor of claim 1, further comprising an anode-cathode insulating layer provided at said lead portion for insulating between said lead portion and said solid electrolyte layer and for insulating between said lead portion and said collector layer.

3. The capacitor of claim 1, wherein said anode lead can be plated.

4. The capacitor of claim 1, wherein said anode lead is connected to a side of said lead portion on which said valve metal porous body is provided.

5. The capacitor of claim 1, wherein said anode lead comprises one of aluminum and metal other than valve metal.

6. The capacitor of claim 1, wherein said anode external terminal comprises a plated film.

7. The capacitor of claim 1, wherein said cathode external terminal comprises a plated film.

8. The capacitor of claim 1, further comprising a cathode lead for connecting said collector layer with said cathode external terminal.

9. The capacitor of claim 8, wherein said cathode lead comprises one of aluminum and metal other than valve metal.

10. The capacitor of claim 1, wherein said solid electrolyte layer comprises conductive polymer.

11. The capacitor of claim 10, wherein said conductive polymer includes polypyrrole or its derivative.

12. The capacitor of claim 10, wherein said conductive polymer includes polythiophene or its derivative.

13. The capacitor of claim 10, wherein said conductive polymer includes compound of polypyrrole or its derivative with polythiophene or its derivative.

14. The capacitor of claim 10, wherein said conductive polymer is formed by chemical polymerization.

15. The capacitor of claim 10, wherein said conductive polymer is formed by electrolytic polymerization.

16. The capacitor of claim 10, wherein said conductive polymer is formed by chemical polymerizations and electrolytic polymerization.

17. A capacitor comprising:
    a stacked body including a plurality of capacitor elements stacked, said plurality of capacitor elements respectively including
    valve metals foil including valve metal porous bodies and lead portions, respectively,
    dielectric layers provided on said valve metal porous bodies, respectively,
    solid electrolyte layers provided on said dielectric layers, respectively, and
    collector layers provided on said solid electrolyte layers, respectively;
    anode leads connected to said lead portions, respectively;
    a housing for accommodating said stacked body and said anode leads, and for having respective ends of said anode leads exposed from a surface thereof;
    an anode external terminal provided over said housing and connected with said respective ends of said anode leads; and
    a cathode external terminal provided over said housing and coupled with said collector layers.

18. The capacitor of claim 17, further comprising an anode-cathode insulating layer provided at said lead portions for insulating between said lead portions and said solid electrolyte layers and for insulating between said lead portions and said collector layers, respectively.

19. The capacitor of claim 17, wherein said anode leads can be plated.

20. The capacitor of claim 17, wherein said anode leads are connected to sides of said lead portions on which said valve metal porous bodies are provided, respectively.

21. The capacitor of claim 17, wherein said anode leads comprise one of aluminum and metal other than valve metal.

22. The capacitor of claim 17, wherein said anode external terminal comprises a plated film.

23. The capacitor of claim 17, wherein said cathode external terminal comprises a plated film.

24. The capacitor of claim 17 further includes cathode leads for connecting said collector layers with said cathode external terminal, respectively.

25. The capacitor of claim 24, wherein said cathode leads comprise one of aluminum and metal other than valve metals.

26. The capacitor of claim 17, wherein said solid electrolyte layers comprise conductive polymer.

27. The capacitor of claim 26, wherein said conductive polymer includes compound of polypyrrole or its derivative with polythiophene or its derivative.

28. The capacitor of claim 26, wherein said conductive polymer is formed by chemical polymerization.

29. The capacitor of claim 26, wherein said conductive polymer is formed by electrolytic polymerization.

30. The capacitor of claim 26, wherein said conductive polymer is formed by chemical polymerizations and electrolytic polymerization.

31. The capacitor of claim 26, wherein said conductive polymer includes polypyrrole or its derivative.

32. The capacitor of claim 26, wherein said conductive polymer includes polythiophene or its derivative.

33. A capacitor comprising:
a stacked body including a plurality of capacitor elements stacked, said plurality of capacitor elements respectively including
valve metal foils having valve metal porous bodies and lead portions, respectively,
dielectric layers provided on said valve metal porous bodies, respectively, and
first solid electrolyte layers provided on said dielectric layers, respectively;
a collector layer provided over said stacked body;
anode leads connected to said lead portions, respectively;
a housing for accommodating said stacked body, said collector layer, and said anode leads, and for having respective ends of said anode leads exposed from a surface thereof;
an anode external terminal provided over said housing and connected with said respective ends of said anode leads; and
a cathode external terminal provided over said housing and coupled with said collector layer.

34. The capacitor of claim 33, further comprising a second solid electrolyte layer provided on said stacked body.

35. The capacitor of claim 34, wherein said second solid electrolyte layer comprises conductive polymer.

36. The capacitor of claim 35, wherein said conductive polymer includes compound of polypyrrole or its derivative with polythiophene or its derivative.

37. The capacitor of claim 35, wherein said conductive polymer is formed by chemical polymerization.

38. The capacitor of claim 35, wherein said conductive polymer is formed by electrolytic polymerization.

39. The capacitor of claim 35, wherein said conductive polymer is formed by chemical polymerizations and electrolytic polymerization.

40. The capacitor of claim 35, wherein said conductive polymer includes polypyrrole or its derivative.

41. The capacitor of claim 35, wherein said conductive polymer includes polythiophene or its derivative.

42. The capacitor of claim 33, further comprising an anode-cathode insulating layer provided at said lead portions for insulating between said lead portions and said solid electrolyte layers, and for insulating between said lead portions and said collector layer.

43. The capacitor of claim 33, wherein said anode leads can be plated.

44. The capacitor of claim 33, wherein said anode leads are connected to sides of said lead portions on which said valve metal porous bodies are provided, respectively.

45. The capacitor of claim 33, wherein said anode leads comprise one of aluminum and metal other than valve metal.

46. The capacitor of claim 33, wherein said anode external terminal comprises a plated film.

47. The capacitor of claim 33, wherein said cathode external terminal comprises a plated film.

48. The capacitor of claim 33, further comprising a cathode lead for connecting said collector layer with said cathode external terminal.

49. The capacitor of claim 48, wherein said cathode lead comprises one of aluminum and metal other than valve metal.

50. The capacitor of claim 33, wherein said first solid electrolyte layers comprise conductive polymer.

51. The capacitor of claim 50, wherein said conductive polymer includes compound of polypyrrole or its derivative with polythiophene or its derivative.

52. The capacitor of claim 50, wherein said conductive polymer is formed by chemical polymerization.

53. The capacitor of claim 50, wherein said conductive polymer is formed by electrolytic polymerization.

54. The capacitor of claim 50, wherein said conductive polymer is formed by chemical polymerizations and electrolytic polymerization.

55. The capacitor of claim 50, wherein said conductive polymer includes polypyrrole or its derivative.

56. The capacitor of claim 50, wherein said conductive polymer includes polythiophene or its derivative.

57. A capacitor comprising:
a stacked body including a plurality of capacitor elements stacked, said plurality of capacitor elements respectively including
valve metal foils including valve metal porous bodies and lead portions, respectively, and
dielectric layers provided on said valve metal porous bodies, respectively;
a solid electrolyte layer provided on said stacked body;
a collector layer provided on said solid electrolyte layer;
anode leads connected to said lead portions, respectively;
a housing for accommodating said stacked body, said collector layer, and said anode leads, and for having respective ends of said anode leads exposed from a surface thereof;
an anode external terminal provided over said housing and connected with said respective ends of said anode leads; and
a cathode external terminal provided over said housing and coupled with said collector layer.

58. The capacitor of claim 57, further comprising an anode-cathode insulating layer provided at said lead portions for insulating between said lead portions and said solid electrolyte layer, and for insulating between said lead portions and said collector layer.

59. The capacitor of claim 57, wherein said anode leads can be plated.

60. The capacitor of claim 57, wherein said anode leads are connected to sides of said lead portions on which said valve metal porous bodies are provided.

61. The capacitor of claim 57, wherein said anode leads comprise one of aluminum and metal other than valve metal.

62. The capacitor of claim 57, wherein said anode external terminal comprises a plated film.

63. The capacitor of claim 57, wherein said cathode external terminal comprises a plated film.

64. The capacitor of claim 57, further comprising a cathode lead for connecting said collector layer with said cathode external terminal.

65. The capacitor of claim 64, wherein said cathode lead comprises one of aluminum and metal other than valve metal.

66. The capacitor of claim 57, wherein said solid electrolyte layer comprises conductive polymer.

67. The capacitor of claim 66, wherein said conductive polymer includes compound of polypyrrole or its derivative with polythiophene or its derivative.

68. The capacitor of claim 66, wherein said conductive polymer is formed by chemical polymerization.

69. The capacitor of claim 66, wherein said conductive polymer is formed by electrolytic polymerization.

70. The capacitor of claim 66, wherein said conductive polymer is formed by chemical polymerizations and electrolytic polymerization.

71. The capacitor of claim 66, wherein said conductive polymer includes polypyrrole or its derivative.

72. The capacitor of claim 66, wherein said conductive polymer includes polythiophene or its derivative.

73. A method of manufacturing a solid electrolytic capacitor, comprising the steps of:
providing a valve metal foil including a valve metal porous body and a lead portion;
forming a dielectric layer on the valve metal porous body;
forming a solid electrolyte layer on the dielectric layer;
forming a collector layer formed on the solid electrolyte layer;
connecting an anode lead to the lead portion;
forming a housing for accommodating the valve metal porous body, the dielectric layer, the solid electrolyte layer, the collector layer, and the anode lead, and for having an end of the anode lead exposed from a surface of the housing; and
forming external electrodes over the housing, the external electrodes being connected with the end of the anode lead and the collector layer, respectively.

74. The method of claim 73, wherein said step of connecting the anode lead is executed before said step of forming the dielectric layer.

75. The method of claim 73, further comprising the step of
forming an anode-cathode insulating layer on the lead portion.

76. The method of claim 75, wherein said step of forming the anode-cathode insulating layer is executed before said step of forming the dielectric layer.

77. The method of claim 75, wherein said step of forming the anode-cathode insulating layer is executed after said step of forming the dielectric layer.

78. The method of claim 73, further comprising the step of
removing a portion of the dielectric layer over on the lead portion.

79. The method of claim 78, further comprising the step of
after said step of removing the portion of the dielectric layer, forming an anode-cathode insulating layer at a portion of the lead portion corresponding the removed portion of the dielectric layer.

80. The method of claim 73, further comprising the step of
removing a portion of the solid electrolyte layer over the lead portion.

81. The method of claim 80, further comprising the step of
after the step of removing the portion of the solid electrolyte layer, forming an anode-cathode insulating layer at a portion of the lead portion corresponding to the removed portion of the solid electrolyte layer.

82. The method of claim 73, further comprising the step of
forming a cathode lead between the collector layer with one of the external electrodes.

83. A method of manufacturing a solid electrolytic capacitor, comprising the steps of:
providing a plurality of valve metal foils including valve metal porous bodies and lead portions, respectively;
forming a plurality of capacitor elements, comprising the sub-steps of
forming dielectric layers on the valve metal porous bodies, respectively,
forming solid electrolyte layers on the dielectric layers, respectively, and
forming collector layers on the solid electrolyte layers, respectively;
forming a stacked body including the plurality of the capacitor elements stacked;
connecting anode leads to the lead portions, respectively;
forming a housing for accommodating the stacked body, and for having respective ends of the anode leads exposed from a surface of the housing;
forming an anode external terminal over the housing, the anode external electrode being connected to the respective ends of the anode leads; and
forming a cathode external terminal over the housing, the cathode external electrode being coupled to the collector layers.

84. The method of claim 83, further comprising the step of
forming an anode-cathode insulating layer on respective sides of the lead portions on which the valve metal porous bodies are provided.

85. The method of claim 83, wherein the lead portions include anode-cathode insulating layers thereon, respectively.

86. The method of claim 85, wherein the anode-cathode insulating layers are provided on respective sides of the lead portions on which the valve metal porous bodies are provided.

87. The method of claim 83, wherein said step of connecting the anode leads to the lead portions is executed before said step of forming the stacked body.

88. The method of claim 83, wherein said step of forming the solid electrolyte layers comprises the sub-step of
forming the solid electrolyte layers by chemical polymerization.

89. The method of claim 83, wherein said step of forming the solid electrolyte layers comprises the sub-step of
forming the solid electrolyte layers by electrolytic polymerization.

90. The method of claim 83, wherein said step of forming the solid electrolyte layers comprises the sub-step of
forming the solid electrolyte layers by chemical polymerization and electrolytic polymerization.

91. The method of claim 83, further comprising the step of
forming a cathode lead between each of the collector layers and the cathode external electrode.

92. A method of manufacturing a solid electrolytic capacitor, comprising the steps of:
providing a plurality of valve metal foils including valve metal porous bodies and lead portions, respectively;
forming a plurality of capacitor elements, including the sub-steps of
forming dielectric layers on the valve metal porous bodies, respectively, and
forming first solid electrolyte layers on the dielectric layers, respectively;
forming a stacked body including the plurality of the capacitor elements stacked;
forming a collector layer over the stacked body;
connecting anode leads to the lead portions, respectively;
forming a housing for accommodating the stacked body, and for having respective ends of the anode leads exposed from a surface of the housing;

forming an anode external terminal over the housing, said anode external electrode being connected to the respective ends of the anode leads; and forming a cathode external terminal over the housing, the cathode external electrode being coupled to the collector layer.

93. The method of claim 92, further comprising the step of forming an anode-cathode insulating layer on respective sides of the lead portions on which the valve metal porous bodies are provided.

94. The method of claim 92, wherein the lead portions include anode-cathode insulating layers thereon, respectively.

95. The method of claim 94, wherein the anode-cathode insulating layers are provided on respective sides of the lead portions on which the valve metal porous bodies are provided.

96. The method of claim 92, wherein said step of connecting the anode leads is executed before said step of forming the stacked body.

97. The method of claim 92, wherein said step of forming the first solid electrolyte layers includes the sub-step of forming the first solid electrolyte layers by chemical polymerization.

98. The method of claim 92, wherein said step of forming the first solid electrolyte layers includes the sub-step of forming the first solid electrolyte layers by electrolytic polymerization.

99. The method of claim 92, wherein said step of forming the first solid electrolyte layers includes the sub-step of forming the first solid electrolyte layers by chemical polymerization and electrolytic polymerization.

100. The method of claim 92, further comprising the step of forming a cathode lead between the collector layer and the cathode external electrode.

101. The method of claim 92, further comprising the step of forming a second solid electrolyte layer on the stacked body.

102. The method of claim 101, wherein said step of forming the second solid electrolyte layer includes the sub-step of forming the second solid electrolyte layer by chemical polymerization.

103. The method of claim 101, wherein said step of forming the second solid electrolyte layer includes the sub-step of forming the second solid electrolyte layer by electrolytic polymerization.

104. The method of claim 101, wherein said step of forming the second solid electrolyte layer includes the sub-step of forming the second solid electrolyte layer by chemical polymerization and electrolytic polymerization.

105. A method of manufacturing a solid electrolytic capacitor, comprising the steps of:

forming a plurality of capacitor elements, including the sub-steps of providing a plurality of valve metal foils having valve metal porous bodies and lead portions, respectively, and forming dielectric layers on the valve metal porous bodies, respectively;

forming a stacked body including the plurality of the capacitor elements stacked;

forming a solid electrolyte layer on the stacked body;

forming a collector layer on the solid electrolyte layer;

connecting anode leads to the lead portions, respectively;

forming a housing for accommodating the stacked body, and for having respective ends of the anode leads exposed from a surface of the housing;

forming an anode external terminal over the housing, the anode external electrode being connected to the respective ends of the anode leads; and forming a cathode external terminal over the housing, the cathode external electrode being coupled to the collector layer.

106. The method of claim 105, further comprising the step of forming an anode-cathode insulating layer on respective sides of the lead portions on which the valve metal porous bodies are provided.

107. The method of claim 105, wherein the lead portions include anode-cathode insulating layers thereon, respectively.

108. The method of claim 107, wherein the anode-cathode insulating layers are provided on respective sides of the lead portions on which the valve metal porous bodies are provided.

109. The method of claim 105, wherein said step connecting the anode leads is executed before said step of forming the stacked body.

110. The method of claim 105, wherein said step of forming the solid electrolyte layer includes the sub-step of forming the solid electrolyte layer by chemical polymerization.

111. The method of claim 105, wherein said step of forming the solid electrolyte layer includes the sub-step of forming the solid electrolyte layer by electrolytic polymerization.

112. The method of claim 105, wherein said step of forming the solid electrolyte layer includes the sub-step of forming the solid electrolyte layer by chemical polymerization and electrolytic polymerization.

113. The method of claim 105, further comprising the step of forming a cathode lead between the collector layer and the cathode external electrode.

* * * * *

UNITED STATES PATENT AND TRADEMARK OFFICE
CERTIFICATE OF CORRECTION

PATENT NO. : 6,771,488 B2
DATED : August 3, 2004
INVENTOR(S) : Takagi et al.

It is certified that error appears in the above-identified patent and that said Letters Patent is hereby corrected as shown below:

Title page,
Item [75], Inventors, "Yuji Mid" should read -- Yuji Mido --.

Signed and Sealed this

Fourteenth Day of December, 2004

JON W. DUDAS
*Director of the United States Patent and Trademark Office*

UNITED STATES PATENT AND TRADEMARK OFFICE
CERTIFICATE OF CORRECTION

PATENT NO. : 6,771,488 B2
DATED : August 3, 2004
INVENTOR(S) : Seiji Takagi et al.

It is certified that error appears in the above-identified patent and that said Letters Patent is hereby corrected as shown below:

Column 10,
Line 17, "metals foil" should read -- metal foils --

Signed and Sealed this

Seventh Day of June, 2005

JON W. DUDAS
*Director of the United States Patent and Trademark Office*